H. SCHUCHMAN.
AUTOMOBILE TIRE CHAIN HOOK.
APPLICATION FILED MAR. 22, 1921.
1,421,577.
Patented July 4, 1922.
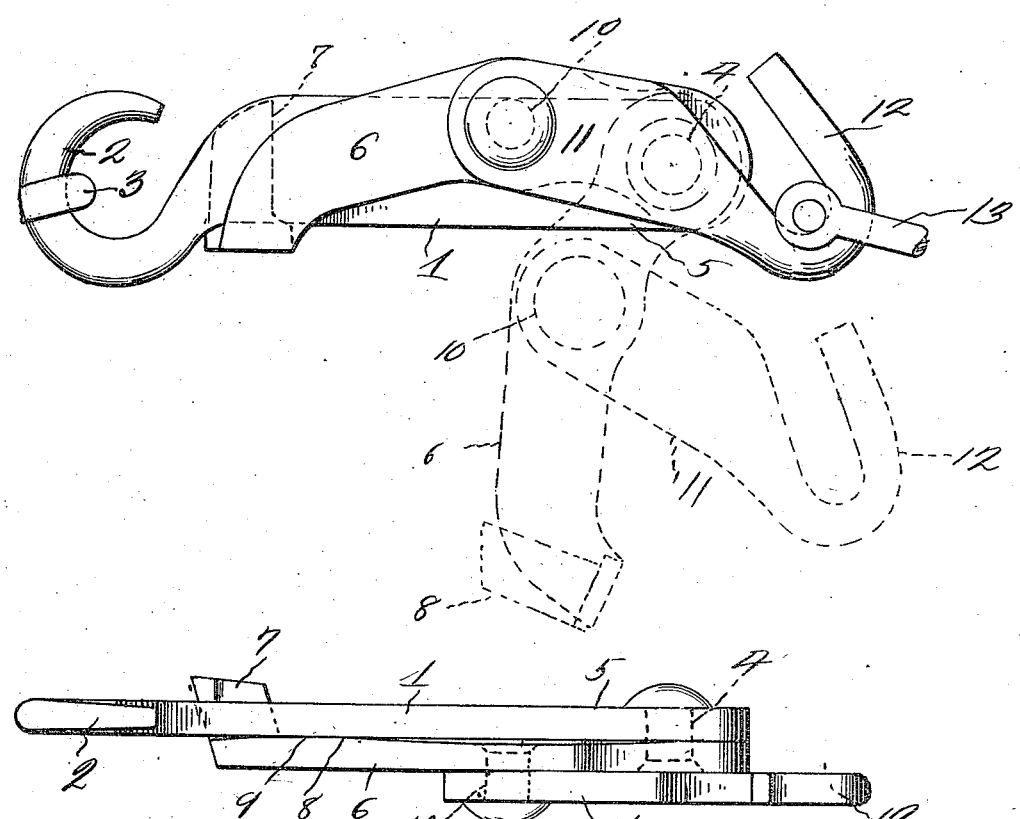
Inventor
H. Schuchman
By D. Swift
Attorney

UNITED STATES PATENT OFFICE.

HARRY SCHUCHMAN, OF LITTLE YORK, ILLINOIS.

AUTOMOBILE TIRE-CHAIN HOOK.

1,421,577. Specification of Letters Patent. Patented July 4, 1922.

Application filed March 22, 1921. Serial No. 454,464.

*To all whom it may concern:*

Be it known that I, HARRY SCHUCHMAN, a citizen of the United States, residing at Little York, in the county of Warren, State of Illinois, have invented a new and useful Automobile Tire-Chain Hook; and I do hereby declare the following to be a full, clear, and exact description of the invention, such as will enable others skilled in the art to which it appertains to make and use the same.

The invention relates to automobile tire chain hooks, and has for its object to provide a device of this character comprising a hook member having pivoted to one of its ends an operating lever and to which operating lever, at a point spaced from its pivoting point, a chain receiving hook is pivoted. Also to position the pivotal point of the hook carried by the operating lever at a point where when the operating lever is moved to closed position, said pivotal point will pass through a line drawn between the pivotal point of the operating lever and the chain engaging point of the hooked member to which the operating lever is pivoted.

A further object is to provide the operating lever with a bulged portion and a spaced lug, between which lug and bulged portion the hooked member is received and frictionally held.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the chain securing hook, showing the parts in the position they assume when opened, said open position being shown in dotted lines.

Figure 2 is a top plan view of the chain hook.

Referring to the drawings, the numeral 1 designates the elongated body member of the device and 2 a chain receiving hook carried thereby for the reception of the chain link 3. Pivotally connected as at 4 to the rear end 5 of the body member 1 is an operating lever 6, which lever extends forwardly, upwardly and downwardly as clearly shown in Figure 1 and terminates in a spaced upwardly extending lug 7, between which lug 7 and the inner wall 8 of the operating lever 6 the body member 1 is received and frictionally held by engagement with the bulged portion 9 of the operating lever. By providing frictional holding of the body member 1, it will be seen that when the chains on the vehicle wheels are slack that the operating lever will be maintained in proper relation to the body member 1 and against opening and consequent loss. Pivotally connected as at 10 to the operating lever 6 and at a point spaced from its pivotal point 4 is the inner end 11 of a hooked member 12, which hooked member receives the other end 13 of the tire chain. It will be seen that the adjacent ends of the tire chain are securely held in position and that when the operating lever is moved to closed position as shown in Figure 1 the slack will be removed and taken up from the chain. To prevent opening of the operating lever 6 under strains, the pivotal point 10 is so positioned on the operating lever 6 that when the operating lever is forced to closed position as shown in Figure 1, said pivotal point 10 will pass through a line drawn between the pivotal point 4 and the chain engagement point with the hooked member 2. The pivotal point 10 is above said pivotal point 4 and chain bearing point on the hooked member 2, therefore upon strain upon the chain, the operating lever 6 will be held in closed position.

From the above it will be seen that a chain securing hook for motor driven vehicles is provided, which hook is simple in construction, positive in its operation and one wherein the parts have been reduced to a minimum, thereby reducing the cost of construction to a minimum.

The invention having been set forth what is claimed as new and useful is:—

A chain securing hook and take up comprising an elongated member having a hook at one of its ends, an operating lever pivoted to the other end of said elongated member, a chain receiving hook pivoted to the operating lever at a point spaced from its ends, the free end of said operating lever being provided with an offset arm adapted to receive the elongated member, the operating lever having its inner face provided with a compound curve, the convexed portion of which is disposed adjacent the offset arm of the operating lever and forming means for frictionally engaging the side of the elongated member and holding the operating lever frictionally against displacement.

In testimony whereof I have signed my name to this specification in the presence of two subscribing witnesses.

HARRY SCHUCHMAN.

Witnesses:
J. E. TIPPETT,
RAY M. WHITEMAN.